May 30, 1967

L. DUBIN ET AL 3,323,034

SWITCHING TECHNIQUES IN REGULATED D.C. POWER SUPPLIES

Filed June 5, 1963

INVENTORS
SOL GREENBERG
LESTER DUBIN
GEORGE GAUTHERIN

BY Morgan, Finnegan, Durham & Pine

ATTORNEYS

INVENTORS
SOL GREENBERG
LESTER DUBIN
GEORGE GAUTHERIN

BY Morgan, Finnegan, Durham + Pine

ATTORNEYS

United States Patent Office 3,323,034
Patented May 30, 1967

3,323,034
SWITCHING TECHNIQUES IN REGULATED D.C. POWER SUPPLIES
Lester Dubin, Pelham Manor, Sol Greenberg, Port Washington, and George Gautherin, Woodside, N.Y., assignors to Lambda Electronics Corporation, Huntington, N.Y., a body corporate of New York
Filed June 5, 1963, Ser. No. 285,829
17 Claims. (Cl. 321—16)

This invention relates to switching techniques for regulated D.C. power supplies and more particularly to switching techniques for regulating A.C.-to-D.C. power supplies.

The invention has for a general object improvements in regulated D.C. power supplies, particularly high current switching types, to the end that certain disadvantages associated with conventional supplies of this type (such as control circuit complexity, line frequency sensitivity, alternate-cycle instability tendencies, control lag, and phase shift sensitivity), are eliminated or reduced while their advantages (such as improved power handling capacity over variable impedance regulators), are retained and in some cases improved.

Other objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described.

Serving to illustrate exemplary embodiments of the invention together with explanatory data are the drawings of which:

Figure 1:
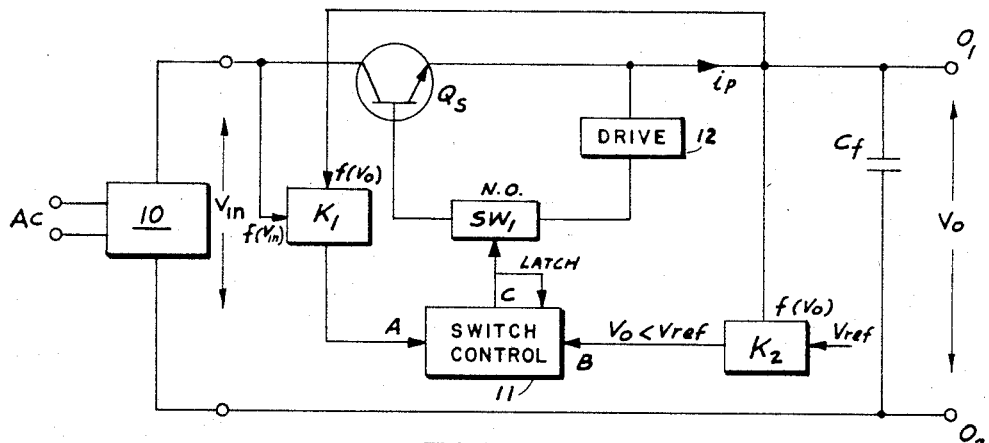
FIGURE 1 is a schematic diagram illustrating a regulating circuit according to the invention.

In the circuit illustrated in FIGURE 1 a power input circuit 10 is adapted to be energized from an available source of alternating current which may be of any power frequency such as 25 cps., 60 cps. or 500 cps.

Circuit 10, which may comprise a transformer and rectifier combination, develops a voltage which is applied as $V_{in}$ to a controlled switch herein exemplified as the emitter-collector circuit of a switching transistor, $Q_s$. The emitter-collector circuit of $Q_s$ is in serial relation with the power input circuit 10 and with an output circuit including output terminals $O_1$ and $O_2$ and a filter capacitance $C_f$; output voltage $V_o$ is developed across $C_f$.

Generally there will be additional components connected to the output circuit; appropriate means for adjusting the output including adjustable dividers and reference potentials are included in the output and control circuits; in some cases a fine regulator (not shown) will be connected thereto. It should also be noted that although the following discussion treats output voltage as the controlled quantity, in appropriate cases output current may be similarly regulated.

The transistor $Q_s$ includes a drive circuit 12 and switching means $SW_1$ illustratively connected between its base and emitter. This arrangement is intended to symbolize the general case of a switch transistor drive circuit as well as means for modifying drive to the transistor to switch it between more ("on") and less ("off") conductive states.

Operatively coupled to switching means $SW_1$ is a switch control circuit 11 which embodies a suitable circuit and components for actuating $SW_1$. The control circuit receives inputs A and B and supplies an output control signal C to $SW_1$. The switch control circuit also provides a latching or lockout function for holding the control circuit for a period of time in the condition which occurs when signal C terminates. This is symbolized by the return arrow marked "LATCH."

Input A is derived from a reset control circuit $K_1$ which receives inputs $V_{in}$ and $V_o$ or functions thereof, and provides output A when $V_{in}$ is less than $V_o$.

Input B is derived from an error detecting or comparison circuit $K_2$ which receives output voltage $V_o$ or a function thereof as one input, and a reference potential, $V_{ref}$, as another. It provides output B when $V_o$ is less than $V_{ref}$.

In the following description, reference may also be had to FIGURE 2 which symbolically indicates certain aspects of system behavior.

Figure 2:
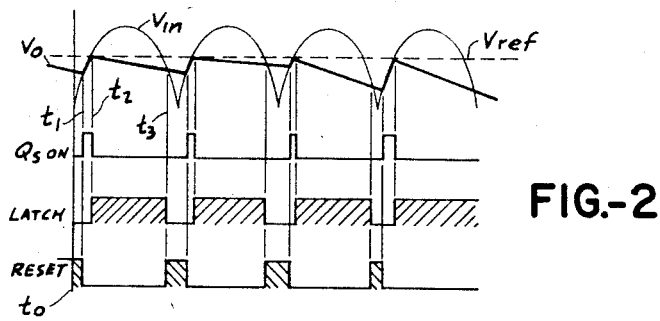
FIGURES 2 and 3 are timing diagrams illustrating certain performance characteristics of the arrangements of FIGURES 1, 1A and 1B.

For the purposes of the discussion it is assumed that input circuit 10 comprises a full wave rectifier producing the full wave voltage, $V_{in}$, as shown in FIGURE 2. Voltage $V_o$ is depicted as a typical filtered waveform with ripple exaggerated to facilitate explanation. For simplicity $V_{ref}$ is shown as having a value corresponding with the peak value of $V_o$ but may actually be a fraction thereof which is in effect compared with a fraction of $V_o$.

Starting at a time, $t_0$, $V_{in}$ rises from a low value and approaches $V_o$ which is decaying due to the discharge of $C_f$. At time $t_1$, the voltage $V_{in}$ is equal to $V_o$ and exceeds $V_o$ thereafter for the indicated interval $t_1$ to $t_3$. During this interval and as seen in FIGURE 1, the emitter-collector potential of $Q_s$ permits forward conduction. Also at time $t_1$, and as shown in FIGURE 2, the output voltage $V_o$ has decayed to a value less than that of the reference, $V_{ref}$. Hence input signal B occurs and the switch control circuit 11 switches $SW_1$ on. Drive is thereby provided for $Q_s$ and emitter-collector current, $i_p$, flows charging $C_f$ and raising $V_o$ as indicated in the interval $t_1-t_2$ of FIGURE 2. When, at time $t_2$, the output voltage approaches equality with the reference, $V_{ref}$, then signal B terminates since $V_o$ is no longer less than $V_{ref}$. $SW_1$ is thus switched off and $Q_s$ is thereby cut off. Due to the latching or lock out function, the control circuit is held inoperable until the time $t_3$. At time $t_3$, $V_{in}$ falls below $V_o$, hence, as seen in FIGS. 1, 2, the reset signal is initiated. This signal terminates the latch function whereby further switching may occur. Note however, that at $t_3$ further conduction of $Q_s$ is precluded because $V_{in}$ falls below $V_o$. With the circuit reset, however, readiness for a switching cycle during the next succeeding period is established.

In the illustrated case, it may be seen that the switching is initiated during the leading or rising period of the input and is terminated in accordance with a relation between $V_o$ and $V_{ref}$, e.g., when $V_o$ equals $V_{ref}$. The conduction period is automatically controlled to return $V_o$ to the reference value, this period being automatically adjusted to account for line voltage changes, varying discharge rates of $C_f$ due to load changes, and other disturbances. Note in FIGURE 2 that notwithstanding $V_o$ decays at varying rates during each cycle, due for example to a dynamic load, the switch conduction period, "$Q_s$ on," is automatically controlled to bring $V_o$ back to $V_{ref}$. Following this, latch out occurs and then reset. By this arrangement, several disadvantages characterizing conventional switching circuits in regulated supplies are eliminated while their advantages are preserved.

Figure 1A:
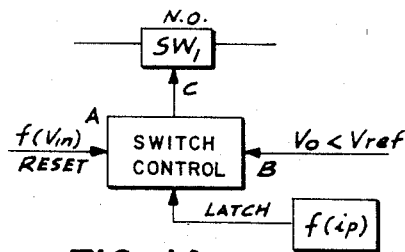
FIGURES 1A and 1B are fragmentary block diagrams illustrating modifications to the circuit of FIGURE 1.
Figure 1B:
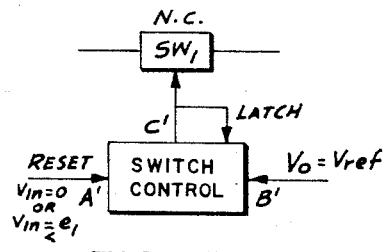
Figure 3:
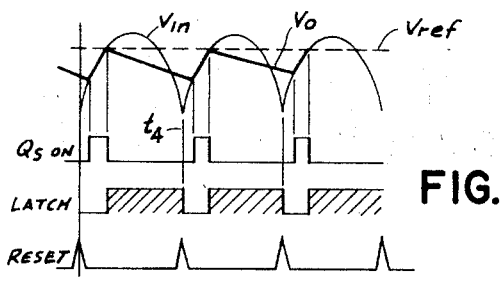

Several variations of the foregoing are shown in FIGURES 1A and 1B. In FIGURE 1A the reset action is simply a function of $V_{in}$ and the latch function is initiated as a function of current $i_p$ flowing in the emitter-collector circuit of $Q_s$. In FIGURE 1B, switching means $SW_1$ is normally closed (conductive), input B' occurs when $V_o$ equals $V_{ref}$, and reset input A' occurs when $V_{in}$ equals 0, (see FIG. 3), or when $V_{in}$ equals $e_1$, where $e_1$ is an appropriate potential. Latching occurs when signal C' is applied to $SW_1$.

In the example of FIGURE 1B (see also FIGURE 2) switching means $SW_1$ is normally closed and thus $Q_3$ conducts as soon as $V_{in}$ equals $V_o$. When $V_o$ is increased to the point where it equals $V_{ref}$, input B' occurs and in this case the switch control responds by supplying a signal C' which opens $SW_1$ to cut off $Q_s$.

Figure 4:
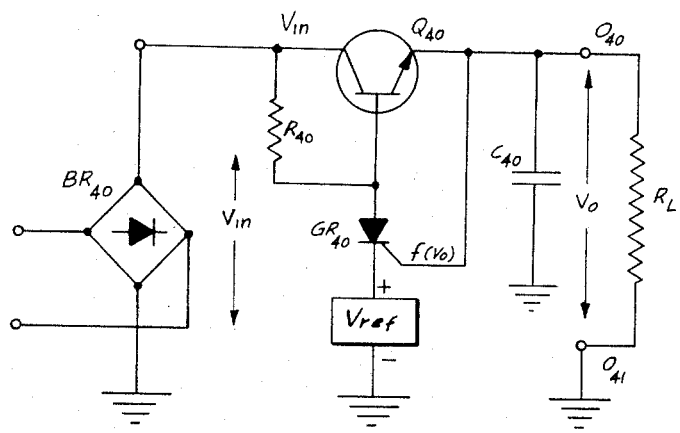
FIGURES 4–13 are schematic diagrams of various circuit configurations according to the invention.

Specific circuit embodiments related to the foregoing are described below:

The simplified circuit of FIGURE 4 includes a full wave bridge rectifier $BR_{40}$ which supplies current to an output circuit under the control of switching transistor $Q_{40}$ whose emitter-collector circuit is connected between $BR_{40}$ and the output circuit. Filter capacitor $C_{40}$ is connected across the output terminals as are means constituting a load, $R_L$.

Connected between the collector and base of $Q_{40}$ is a resistance $R_{40}$; the base is also connected to the return line of the supply via the serial combination comprising the anode-cathode circuit of a gated rectifier $GR_{40}$, which may be a silicon controlled rectifier, and a source of reference potential $V_{ref}$. The gate of $GR_{40}$ is connected to output terminal $O_{40}$.

As $V_{in}$ rises and exceeds $V_o$, which may be decaying, the emitter-collector of $Q_{40}$ becomes forward-biased and base-emitter drive is supplied via $R_{40}$. $Q_{40}$ conducts, charging filter $C_{40}$ and raising $V_o$. When the output voltage $V_o$ which is sampled by the gate of $GR_{40}$ exceeds $V_{ref}$, current flows in the gate-cathode circuit of $GR_{40}$; the latter conducts thereby cutting off $Q_{40}$. Because of the latching characteristic of $GR_{40}$, which is in the nature of a memory function, the controlled rectifier remains in the conductive state for a period of time even though gate current may cease as a result of the discharge of $C_{40}$ which acts to drop $V_o$ below $V_{ref}$. The transistor $Q_{40}$ is maintained cut off for this latched period. When $V_{in}$ falls below $V_{ref}$, the gated rectifier is reverse-biased and thus cuts off, thereby terminating the latching function and providing reset. During the interval from this cut-off time to the time when $V_{in}$ falls below $V_o$, the circuit may be switched on again.

Figure 5:
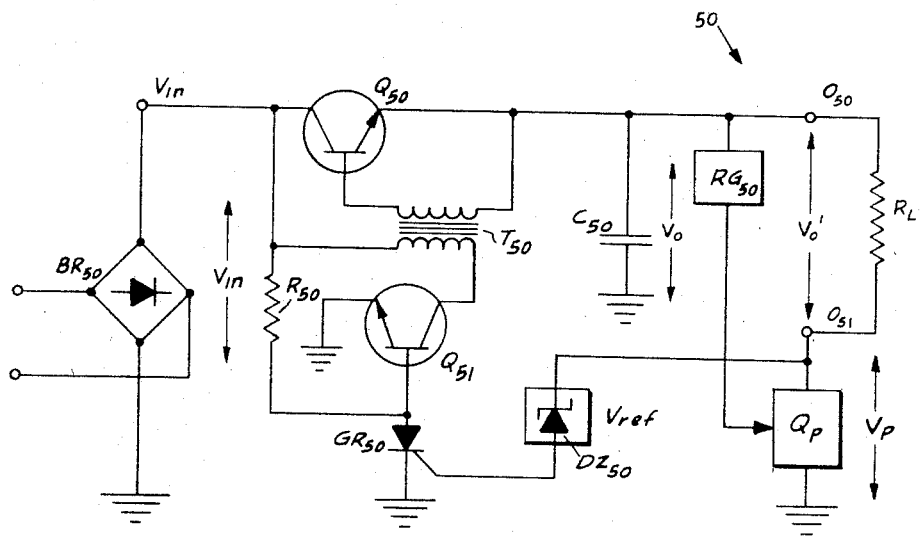

The circuit of FIGURE 5 provides a switching transistor $Q_{50}$ having an emitter-collector circuit connected in one leg of the supply between the power source embodied as bridge $BR_{50}$, and an output circuit generally indicated at 50. The output circuit includes filter $C_{50}$ connected across the combination of $BR_{50}$ and $Q_{50}$, and a regulator circuit including regulator control system $RG_{50}$, and a series variable impedance circuit $Q_p$ which is in series with output terminals $O_{50}$, $O_{51}$. Variable impedance $Q_p$ and the output terminals are connected across $C_{50}$ while $RG_{50}$ senses departures in output voltage $V_o'$ from a reference value and in known manner develops an appropriate control signal for $Q_p$ whereby the latter, which may comprise a pass transistor undergoes the requisite impedance change to correct the output voltage variation.

Connected between the base and emitter of $Q_{50}$ is the secondary of a coupling transformer $T_{50}$. The primary winding is connected in series with the emitter-collector circuit of a control transistor $Q_{51}$, this resultant branch being connected across the output terminals of $BR_{50}$.

The base of $Q_{51}$ is connected to the junction of resistance $R_{50}$ and the anode of $GR_{50}$, a controlled rectifier. The series branch $R_{50}$, $GR_{50}$ is also connected across the rectifier circuit and is thus energized by $V_{in}$. The gate of $GR_{50}$ is connected to output terminal $Q_{51}$ via zener diode $DZ_{50}$ which conducts when a reverse voltage of proper polarity is applied thereto. The voltage applied to $DZ_{50}$ comprises essentially the drop $V_p$ across the series variable impedance $Q_p$. (The zener voltage is illustratively much larger than the gate voltage of $GR_{50}$.) Hence the switching circuit will function to maintain this drop substantially constant. For purposes of explanation this may be regarded as accomplished if the switching circuit keeps the voltage $V_o$ across filter $C_{50}$ at a constant value.

As the voltage $V_{in}$ rises above the value $V_o$, the emitter-collector circuit of $Q_{50}$ becomes forward-biased. $V_{in}$ also appears across the anode-cathode of $GR_{50}$, it being assumed that the controlled rectifier is non-conducting. In its initial rise this voltage forward-biases the emitter-base of $Q_{51}$ and the emitter-collector of the latter conducts causing current to flow through the primary of $T_{50}$. This current induces a forward-biasing voltage in the secondary. When $V_{in}$ subsequently exceeds $V_o$, stage $Q_{50}$ conducts. The voltage $V_o$ therefore rises as $C_{50}$ is charged. Assuming $V_o'$ is held constant by $Q_p$, then voltage $V_p$ will rise. $Q_{50}$ continues conducting until $V_p$ exceeds the breakdown voltage, $V_{ref}$, of zener diode $DZ_{50}$; at this time the latter conducts; gate-cathode current flows in $GR_{50}$ and the latter conducts. This tends to cut off $Q_{51}$ thus cutting off $Q_{50}$. $Q_{50}$ remains cut off because of the latching function of $GR_{50}$ which will continue conductive until $V_{in}$ drops to a low extinguishing value. At this time the circuit is reset and conditioned for switching during the next cycle, the switching interval being automatically adjusted to recharge $C_{50}$ to the requisite voltage.

Figure 6:
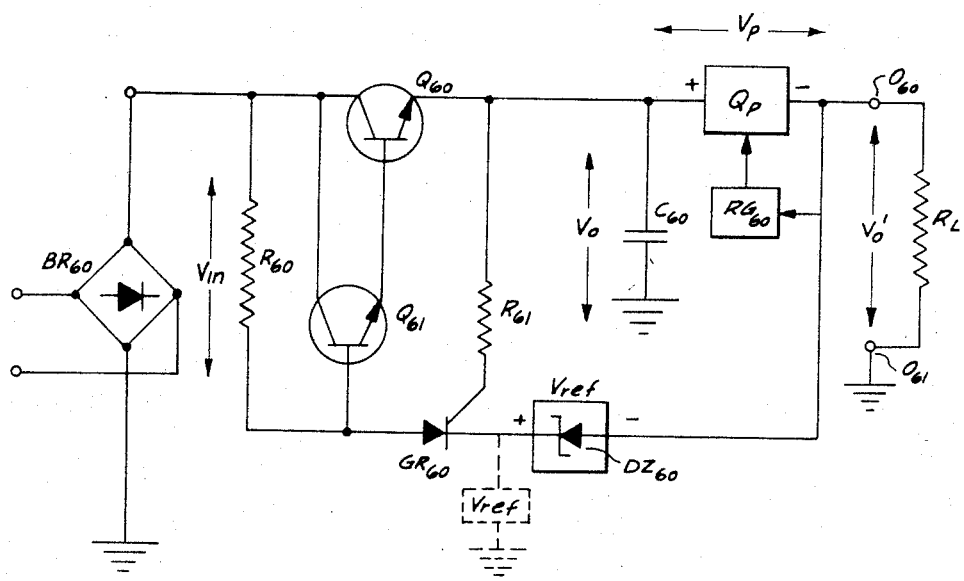

The circuit of FIGURE 6 includes a rectifier embodied as a bridge $BR_{60}$. Connected between one output terminal of the bridge and an output circuit generally indicated at 60 is the emitter-collector circuit of a switching transistor $Q_{60}$. The emitter or output electrode of $Q_{60}$ is connected to one side of filter capacitance $C_{60}$, the other side of the capacitor being connected to the return leg of the bridge.

In addition to $C_{60}$, the output circuit 60 includes a series-connected variable impedance device $Q_p$ and output terminals $O_{60}$ and $O_{61}$ adapted to supply power to a load $R_L$. In contrast with the circuit of FIGURE 5, the variable impedance $Q_p$ in FIGURE 6 is in the positive leg of the supply, output terminal $Q_{61}$ being connected to the return terminal of the bridge.

The variable impedance $Q_p$ is controlled by regulator system $RG_{60}$ in accordance with variations in the output voltage $V_o'$ as sensed by $RG_{60}$.

A circuit for controlling the switching transistor $Q_{60}$ comprises a transistor $Q_{61}$ having an emitter and collector connected to the base and collector, respectively, of $Q_{60}$. The base of $Q_{61}$ is connected through a resistance $R_{60}$ to the positive terminal of the bridge and is also connected through a serial combination of a controlled rectifier $GR_{60}$ and zener diode $DZ_{60}$ to output terminal $O_{60}$. The gate electrode of $GR_{60}$ is connected via $R_{61}$ to the emitter of $Q_{60}$.

As $V_{in}$ increases to the point where it exceeds $V_o$, driver $Q_{61}$ and switch $Q_{60}$ conduct, charging $C_{60}$. The voltage $V_o$ across $C_{60}$ thus rises. Assuming that output voltage $V_o'$ is held constant by $Q_p$, then as the voltage $V_p$ rises and exceeds the breakdown voltage of zener diode $DZ_{60}$, gate-cathode current flows through $GR_{60}$ via $R_{61}$ and $DZ_{60}$. The controlled rectifier therefore conducts, its anode-cathode circuit being energized by the difference between $V_{in}$ and $V_o'$ plus $V_{ref}$. The conduction of $GR_{60}$ cuts off $Q_{61}$ and $Q_{60}$, thus terminating the rise in $V_o$ and $V_p$. The latching function of $GR_{60}$ maintains this condition until $V_{in}$ drops below $V_o'$ plus $V_{ref}$. At this time the anode-cathode of $GR_{60}$ is reverse-biased and the controlled rectifier cuts off. The circuit is accordingly reset in readiness for switching during the next input cycle.

As an alternate to the above-described arrangement, the zener diode $DZ_{60}$ may be replaced by suitable means for developing a reference potential as shown in the dashed lines of FIGURE 6. Such an arrangement may be connected from the cathode of $GR_{60}$ to the return terminal of the bridge.

Figure 7:
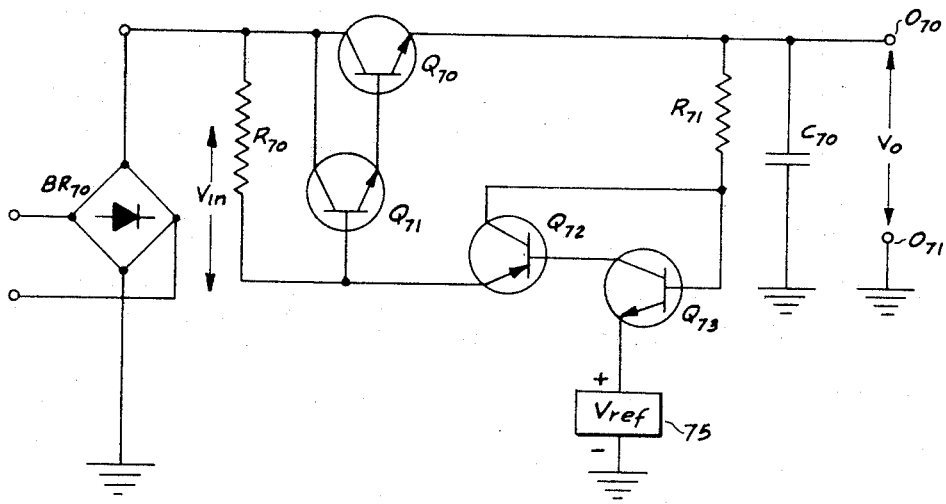

The circuit of FIGURE 7 is similar in certain respects to the circuit of FIGURE 6 and is designed to illustrate the development of a memory function other than by the use of a controlled rectifier.

Connected to the base of driver $Q_{71}$ is the emitter of a transistor $Q_{72}$. The collector of $Q_{72}$ is connected to the base of a further transistor $Q_{73}$ and both electrodes are connected to output terminal $O_{70}$ via resistor $R_{71}$. The base of $Q_{72}$ is connected to the collector of $Q_{73}$ while the emitter of the latter is connected to the return terminal of the bridge through a reference producing device 75.

An additional regulator system is not employed in the circuit of FIGURE 7 and the voltage $V_o$ across filter $C_{70}$ may be regarded as the output voltage.

Assuming $Q_{72}$ and $Q_{73}$ to be initially cut off, then a rise in $V_{in}$ above $V_o$ will switch $Q_{70}$ into its conductive state with the aid of $Q_{71}$. As the output voltage $V_o$ rises to the desired potential, $Q_{73}$ becomes forward biased, it being originally cut off because of the back bias supplied by the reference potential means 75. The resultant conduction through the collector-emitter of $Q_{73}$ via the emitter base of $Q_{72}$, causes this circuit to be energized by $V_{in}$. Stage $Q_{72}$ accordingly conducts as well and switch transistor $Q_{70}$ is thus switched off. The combination $Q_{72}$, $Q_{73}$ will continue to conduct thereby holding $Q_{70}$ in the cut off condition notwithstanding a drop in $V_o$ below $V_{ref}$. This results from the fact that the collector current of $Q_{72}$ supplies drive current for the base-emitter of $Q_{73}$. The combination will ultimately cut off when $V_{in}$ drops to a sufficiently low value to reverse-bias $Q_{72}$ and $Q_{73}$. The circuit is thus reset and conditioned for the next succeeding cycle.

Figure 8:
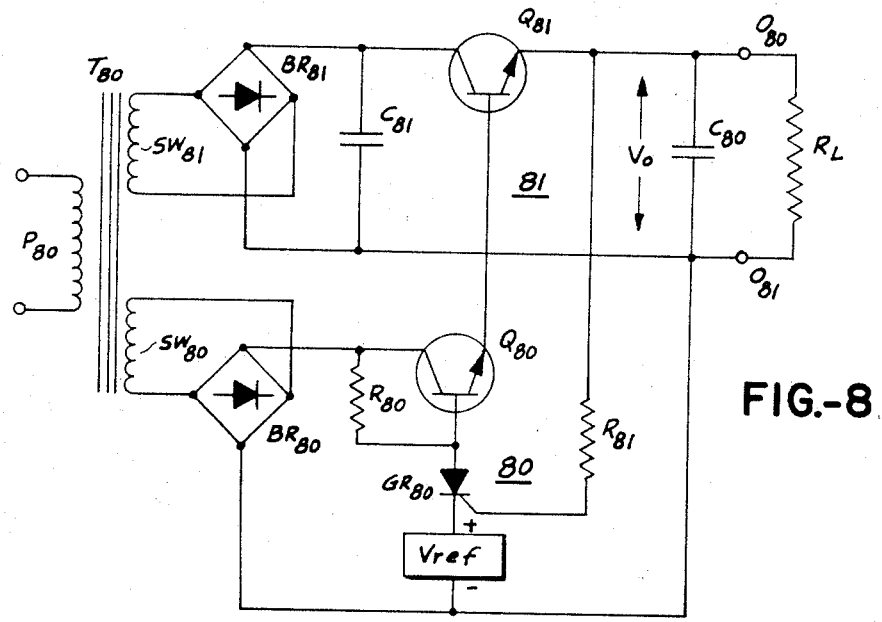

The system of FIGURE 8 may be seen to comprise two interconnected sections 80 and 81. Section 80 resembles in a number of respects the circuit of FIGURE 4. It includes switching transistor $Q_{80}$ connected to an output terminal of a rectifier $BR_{80}$ which is energized from a winding $SW_{80}$ of power transformer $T_{80}$. Initial drive for $Q_{80}$ is by way of $R_{80}$ interconnecting collector and base. The base is also connected to the switching control circuit including controlled rectifier $GR_{80}$ and means for providing a reference potential, $V_{ref}$. The gate of $GR_{80}$ is connected via sensitive $R_{81}$, to output terminal $O_{80}$.

In the instant embodiment, the switching transistor $Q_{80}$ does not directly charge the output filter $C_{30}$, but rather controls a power transistor $Q_{81}$ which performs this function. Transistor $Q_{81}$ has its emitter-collector circuit connected between output filter $Q_{80}$ and a source of filtered D.C. provided by secondary winding $SW_{81}$, rectifier $BR_{81}$ connected thereto, and filter $C_{81}$.

As switching circuit 80 operates in the manner hereinbefore described, $Q_{80}$ is synchronously switched on, switched off, latched and reset. When switched on, $Q_{80}$ supplies drive to $Q_{81}$ via emitter to base connection. $Q_{81}$ is accordingly switched in correspondence with $Q_{80}$ to control the charging of $C_{80}$ whereby the output voltage $V_o$ is controlled.

Figure 9:
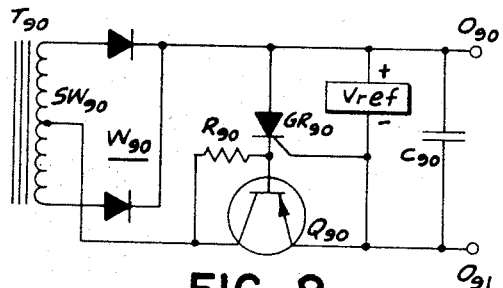

In FIGURE 9, switching transistor $Q_{90}$ is placed in the negative leg of the supply and the rectifier $W_{90}$ comprises a full wave common cathode arrangement with a center tapped transformer secondary $SW_{90}$. Operation of the circuit is as generally described hereinbefore.

Figure 10:
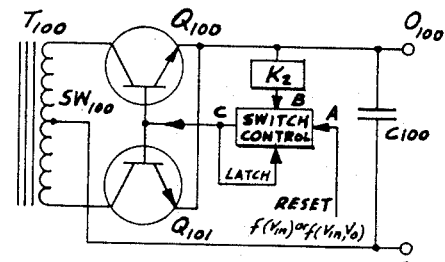

FIGURE 10 illustrates schematically, application of the techniques hereinbefore described to a pair of switching transistors $Q_{100}$, $Q_{101}$ which also serve as the rectifying elements, being illustratively disposed in full wave connection with the secondary winding $SW_{100}$ of power transformer $T_{100}$. Each switching transistor is controlled during its respective half cycle period to regulate the charge across output filter $C_{100}$, the sequence comprising a switching on of the transistor until the output attains the desired value, then a switching off and latching of the transistor, followed by reset.

Figure 11:
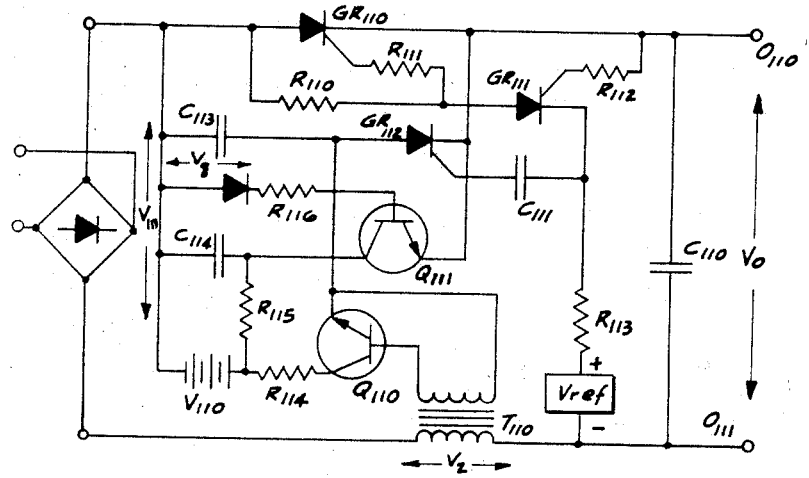

In the circuit of FIGURE 11, the anode-cathode circuit of a controlled rectifier $GR_{110}$ is connected between the power supply bridge $BR_{110}$ and the output filter $C_{110}$. The latter shunts the output terminals $O_{110}$, $O_{111}$.

For initially switching $GR_{110}$ to the on state when $V_{in}$ rises to a sufficiently high value, a circuit is provided comprising resistances $R_{110}$, $R_{111}$ serially connected between the anode and gate of $GR_{110}$. When $V_{in}$ reaches the conducting value where it exceeds $V_o$ (the drop across the primary winding of a transformer $T_{110}$ in the return leg is disregarded at this time), then current will flow through $R_{110}$, $R_{111}$, and the gate-cathode of $GR_{110}$ causing conduction in the anode-cathode circuit and the resultant charging of $C_{110}$.

As $C_{110}$ charges, output voltage $V_o$ rises. Voltage $V_o$ is applied to a series circuit comprising a resistance $R_{112}$, the gate-cathode of a controlled rectifier $GR_{111}$, a resistance $R_{113}$ and a reference potential source, $V_{ref}$. When $V_o$ reaches the prescribed value, the reverse-biasing effect of $V_{ref}$ is overcome and gate-cathode current flows in $GR_{111}$. At this time, $V_{in}$ exceeds $V_{ref}$ and anode-cathode current flows in $GR_{111}$.

When $GR_{111}$ turns on it supplies a current from its cathode through a capacitance $C_{111}$ to the gate-cathode circuit of a controlled rectifier $GR_{112}$, the cathode of which is connected to the cathode of $GR_{110}$. The anode of $GR_{112}$ is connected via a capacitor $C_{113}$ to the anode of $GR_{110}$; hence the serial combination of $C_{113}$ and $GR_{112}$ bridges the main switching rectifier $GR_{110}$. As described more fully hereinafter, $C_{113}$ is periodically charged with a voltage $V_q$ and when $GR_{112}$ is switched on, $C_{113}$ discharges, forcing a reverse cut off current to flow through the main switching rectifier $GR_{110}$. This action closely follows the aforementioned switching of $GR_{111}$. Hence $GR_{110}$ is cut off when $V_o$ reaches the required value.

The extinguishing voltage $V_q$ stored across $C_{113}$ is derived from a circuit which includes a voltage source $V_{110}$, resistance $R_{114}$, and the emitter-collector circuit of a transistor $Q_{110}$, all in serial relation. The base-emitter of $Q_{110}$ is connected to the secondary winding of transformer $T_{110}$ in such a manner that load current initially flowing through the primary as $GR_{110}$ conducts, induces a forward biasing voltage in the secondary whereupon $Q_{110}$ conducts and $C_{113}$ is charged from $V_{110}$.

During the interval when voltage $V_q$ is forcing cut-off current through $GR_{110}$, the second voltage of $T_{110}$ reverses polarity; $Q_{110}$ is cut off, isolating $C_{113}$ from $V_{110}$. As voltage $V_q$ decays, a transistor $Q_{111}$ is switched on. This transistor has its emitter-collector circuit in series with a capacitance $C_{114}$, the combination being connected across $C_{113}$ and $GR_{112}$. $C_{114}$ is charged from $V_{110}$ via a resistance $R_{115}$ and as $Q_{111}$ is switched on, $C_{114}$ discharges through its emitter-collector, thereby supplying a cut off current which flows through $GR_{112}$ and cuts the latter off. $GR_{111}$ cuts off when $V_{in}$ falls below $V_{ref}$ at which time it is reversed-biased. The circuit is accordingly reset and thereby conditioned for the next cycle.

Figure 12:
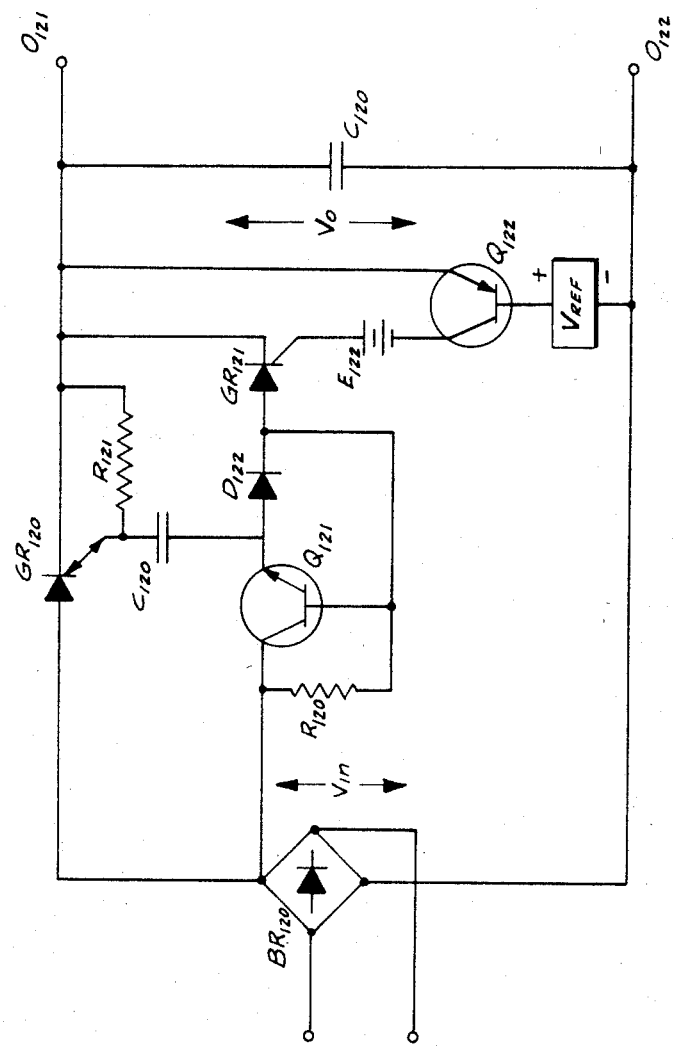

The embodiment of FIGURE 12 employs as the switching means between input voltage $V_{in}$ and output voltage $V_o$, a semiconductive switch $GR_{120}$ which is illustratively a three terminal device but may be of four terminal configuration. Switch $GR_{120}$ has a gate for controlling conduction and cut off of the anode-cathode circuit and is thus unlike conventional controlled rectifiers wherein once conduction has been established, the gate-cathode circuit loses control over conduction.

Switching means $GR_{120}$ thus comprises a bilaterally controlled latching rectifier of the type wherein the gate-cathode circuit retains control over anode-cathode conduction and can terminate the latter upon receipt of a control or switching current which flows in the reverse direction from the cathode to the gate. Such a rectifier is illustratively of the type described in the Motorola Company specification sheet for the type MGCS 821 solid state switch.

Switch $GR_{120}$ has its anode-cathode circuit connected between the input circuit bridge, $BR_{120}$ and the output circuit comprising $C_{121}$ connected across output terminals $O_{121}$, $O_{122}$. $GR_{120}$ is switched on and off as hereinafter described whereby controlled pulses of current are fed to the filter $C_{121}$.

The control circuit of $GR_{120}$ includes a resistance $R_{121}$ connected between its gate and cathode, and an npn transistor stage $Q_{121}$; the latter has an emitter which is connected to the gate of $GR_{120}$ via capacitance $C_{120}$, and a collector which is connected to the positive terminal of $BR_{120}$. Collector and base of $Q_{121}$ are interconnected via $R_{120}$.

The emitter of $Q_{121}$ is also connected to the positive leg of the supply via a diode $D_{122}$ and the anode-cathode circuit of a conventional controlled rectifier $GR_{121}$. The base of $Q_{121}$ is connected to this circuit at the junction of $D_{122}$ and $GR_{121}$.

The cathode of $GR_{121}$ is connected to the positive leg of the supply while the gate is connected to the same point through the series combination of a voltage source $E_{122}$ and the collector-emitter circuit of a pnp transistor $Q_{122}$. The base of $Q_{122}$ is returned to the negative supply branch through a source of reference potential, $V_{ref}$.

In a typical operating sequence, transistor stage $Q_{121}$ becomes forward-biased and conducts during the leading or rising interval of bridge voltage $V_{in}$ when this voltage exceeds $V_o$ (residual potentials are ignored for simplicity). Current then flows in the forward direction through $Q_{121}$, $C_{120}$ and the gase-cathode of $GR_{120}$. A part of this current also flows through $R_{121}$. When the gate current reaches the threshold value of $GR_{120}$ the latter is transferred to the conductive state and current is delivered to the output circuit, increasing $V_o$. At this time $Q_{121}$ becomes reversed-biased and $C_{120}$ has received an appropriate charge which, as noted below, is used in the turn-off operation.

When $V_o$ reaches the required value relative to $V_{ref}$, the emitter-base of $Q_{122}$ becomes forward biased and the emitter-collector circuit thereof becomes conductive. At this time $E_{122}$ supplies current from its positive terminal through the gate-cathode of $GR_{121}$ and through the emitter-collector of $Q_{122}$ to its negative terminal. $GR_{121}$ is thus transferred to the conductive state.

With $GR_{121}$ on, the capacitance $C_{120}$, which was charged during the transient period preceding the firing of $GR_{120}$, discharge through the anode-cathode of $GR_{121}$ and through the cathode-gate of $GR_{120}$ whence the latter is cut-off. Conduction of a small current through $GR_{121}$ continues via $R_{120}$ until $V_b$ falls below $V_o$. During the next cycle, the control operation is repeated provided sufficient load current has been drawn from the output circuit.

Figure 13:
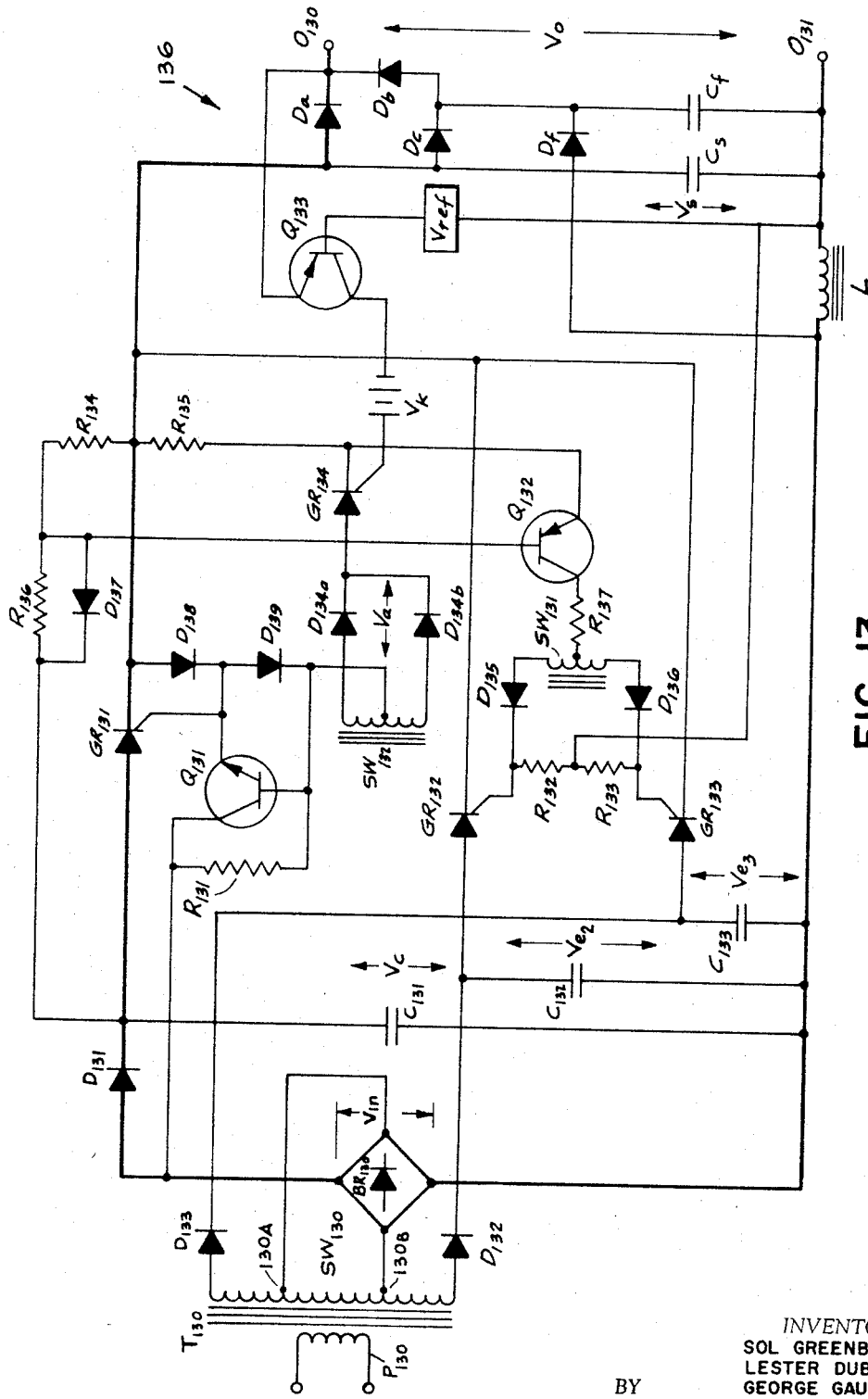

In the embodiment of FIGURE 13, rectified load current is obtained from a bridge rectifier $BR_{130}$ connected to taps 130A, 130B on the secondary winding $SW_{130}$ of a power transformer $T_{130}$. Primary winding $P_{130}$ thereof is adapted for energization from an alternating current source.

The rectifier output is applied to the diode-capacitance combination $D_{131}$, $C_{131}$; the diode is used for isolation while the capacitance serves for transformer leakage inductance compensation. The voltage across $C_{131}$ is applied to a circuit which includes a switching element $GR_{131}$ in the positive leg of the supply, an output circuit generally indicated at 136, and a choke L in the negative supply leg. The output circuit includes filter capacitances $C_s$ and $C_f$ which are primarily charged according to the switching actions of switch $GR_{131}$ and the attendant flyback action of inductor L, respectively.

Turn-on of $GR_{131}$ is effected through a control circuit which includes transistor $Q_{131}$ and resistance $R_{131}$ connected between the collector and base thereof. The collector-emitter circuit of $Q_{131}$ is connected between the positive bridge output terminal and the gate of $GR_{131}$. Hence, when the bridge voltage $V_{in}$ rises sufficiently above the output voltage component $V_s$ across filter $C_s$, then $Q_{131}$ becomes forward biased and current flows through the gate-cathode circuit of switch $GR_{131}$. The latter, which may be a conventional silicon controlled rectifier, thereupon fires, conducting current from $C_{131}$ initially, and then from $BR_{130}$, to the output circuit; the return path includes choke L and thus the load current increases gradually rather than abruptly.

Turn-off of $GR_{131}$ is initiated by a comparator circuit including transistor stage $Q_{133}$. It may be seen that the emitter-base circuit thereof is energized according to the difference between output voltage, $V_o$, and reference potential means, $V_{ref}$. When $V_o$ reaches a predetermined relation with respect to $V_{ref}$, then $Q_{133}$ is switched on. Current then flows from output terminal $O_{130}$ through the emitter-collector circuit, through a source $V_k$, through the gate-cathode circuit of a gated rectifier $GR_{134}$ and through a resistance $R_{135}$ and an output diode $D_a$.

When controlled rectifier $GR_{134}$ is thus energized, an initial cut-off current surge is drawn from a source of voltage $V_a$, which source comprises center-tapped winding $SW_{132}$ and full wave rectifier $D_{134a}$, $D_{134b}$. This current flows through the anode-cathode circuit of $GR_{134}$, through $R_{135}$ and diodes $D_{138}$ and $D_{139}$. Since the emitter-base of turn-on transistor $Q_{131}$ parallels $D_{139}$, then it may be seen that the firing of $GR_{134}$ acts to cut off $Q_{131}$. $Q_{131}$ remains cut off, i.e., is latched off so long as $GR_{134}$ continues to conduct; conduction of $GR_{134}$ ceases when the relations between the voltages $V_{in}$, $V_a$ and $V_s$ produce an extinguishing anode-cathode potential at $GR_{134}$. At this time the circuit is reset and if conditions are proper $Q_{131}$ may again become conductive to thereby trigger $GR_{131}$ into the conductive state.

The cut off of main switch $GR_{131}$ involves further elements of the turn-off circuit including the diode-capacitance combinations $D_{132}$, $C_{132}$ and $D_{133}$, $C_{133}$. These combinations are energized from the respective end terminals of winding $SW_{130}$ and provide voltages $V_{e2}$ and $V_{e3}$ across $C_{132}$ and $C_{133}$, respectively. These voltages as shown below, are employed alternatively under control of associated controlled rectifiers to drive reverse or cut-off current through $GR_{131}$.

The extinguishing voltages $V_{e2}$ and $V_{e3}$ are applied to the anodes of respective controlled rectifiers $GR_{132}$ and $GR_{133}$. The cathodes thereof are connected together and to the cathode of the main switching rectifier $GR_{131}$. Hence when either one of the cut-off rectifiers, $GR_{132}$, $GR_{133}$, conducts, there is applied to the cathode of main switch $GR_{131}$, the voltage $V_{e2}$ or $V_{e3}$. The peak value of each of these voltages exceeds the voltage $V_c$ across $C_{131}$ on the anode side of $GR_{131}$. Thus, the applied voltage, $V_{e2}$ or $V_{e3}$ will drive a reverse current through $GR_{131}$ to cause rapid and positive cut-off thereof. In addition, the actuated rectifier $GR_{132}$ or $GR_{133}$, provides a current path for a part of the flyback current associated with choke L when switch $GR_{131}$ is cut off.

It may be seen that as the voltage $V_{e2}$ or $V_{e3}$ decays, following its application to $GR_{131}$, then the associated control rectifier $GR_{132}$ or $GR_{133}$ also cuts off. Hence the need for additional cut-off circuits to extinguish $GR_{132}$, $GR_{133}$, is eliminated.

The firing of cut-off rectifiers $GR_{132}$ and $GR_{133}$ is controlled according to the condition of $GR_{131}$ and $GR_{134}$. When $GR_{131}$ is conductive, the anode-cathode potential thereof is low. Hence, in the circuit $R_{134}$, $R_{136}$, which shunts $GR_{131}$, the drop across $R_{134}$ is low. When $GR_{134}$ conducts, there is a potential drop across $R_{135}$. The net potential of $R_{134}$ and $R_{135}$ is applied to the base-emitter of a stage $Q_{132}$ and under the above conditions, i.e., with $GR_{131}$ and $GR_{134}$ conductive, $Q_{132}$ is forward biased. The emitter-collector circuit thereof is connected via limiting resistance $R_{137}$ to a source of rectifier potential comprising center-tapped winding $SW_{131}$ and diodes $D_{135}$, $D_{136}$. To this source are connected the gate-cathode circuits of $GR_{132}$ and $GR_{133}$. Hence, when $Q_{132}$ is conductive, current will flow during one half wave period from $SW_{131}$ through $D_{135}$, through the gate-cathode of $GR_{132}$, through $R_{135}$ and thence via the emitter-collector of $Q_{132}$, and $R_{137}$, to the center tap of $SW_{131}$. On the alternate half cycle, current will flow from $SW_{131}$ through $D_{136}$, through the gate-cathode of $GR_{133}$, and thence back to the center tap via $R_{135}$, the emitter collector of $Q_{132}$, and $R_{137}$.

It may be seen that, provided $Q_{132}$ is conducting, and with windings $SW_{130}$ and $SW_{131}$ properly phased, then rectifiers $GR_{132}$ and $GR_{133}$ will fire on alternate cycles, thereby applying the associated quenching voltage $V_{e2}$ and $V_{e3}$ to the main rectifier $GR_{131}$ whereby it is cut-off. Since $Q_{132}$ is switched on when $GR_{134}$ conducts (and provided $GR_{131}$ is on), and since $GR_{134}$ conducts when $V_o$ attains the desired value, then it can be seen that the power switch $GR_{131}$ is cut off during each cycle when $V_o$ is at the required value. During one cycle, the quenching voltage is $V_{e2}$; during the next cycle, $V_{e3}$ is applied. (Besides delivering reverse current through $GR_{131}$, these sources supply transient current pulses to the output circuit.)

It should be noted that $Q_{132}$ will not conduct, and therefore $GR_{132}$ and $GR_{133}$ will not fire, when conditions require that $GR_{131}$ be maintained cut off for the entire cycle. Hence the possibility of delivering unwanted current to the output circuit from $V_{e2}$ or $V_{e3}$ is eliminated.

As noted hereinbefore, $GR_{132}$ and $GR_{133}$ will each automatically cut off when the respective anode voltage, $V_{e2}$ or $V_{e3}$, falls below output voltage component $V_s$. Continued quiescent cut off is insured since the gates are connected via respective resistances $R_{132}$, $R_{133}$, to the negative terminal $O_{131}$.

The output circuit includes filter capacitance $C_s$ which is supplied current via $GR_{131}$ and is connected to output terminal $O_{130}$ via diode $D_a$. Another filter $C_f$ receives flyback current from choke L via diode $D_f$ and is connected to output terminal $O_{130}$ via a diode $D_b$; the common terminals of $C_s$ and $C_f$ are connected to choke L and to output terminal $O_{131}$. Diode $D_c$ interconnects the other terminals of $C_s$ and $C_f$. During conduction of $GR_{131}$, current from the source is switched to $C_s$. Load current is delivered to the output from $C_s$ via $D_a$. When $GR_{131}$ is cut off, flyback current is delivered via $D_f$ to $C_f$ and to output terminal $Q_{131}$ from $C_f$ via $D_b$.

Further features and aspects of the output circuit are described and claimed in copending application Serial No. 285,830, filed June 5, 1963, now Patent No. 3,293,532, and assigned to the assignee of the instant application.

It may be seen from the foregoing that the dual, alternately operative cut-off circuits including $GR_{132}$, $GR_{133}$ and the related sources and elements have the advantage of maintaining a cut-off voltage available for application to $GR_{131}$ at all times. Hence, when voltage $V_{e2}$ is depleted during the switching off of $GR_{131}$ during one cycle, the voltage $V_{e3}$ is available for this function during the next cycle; $V_{e2}$ can be recharged during this next cycle. Moreover the control circuits of $GR_{132}$, $GR_{133}$ are such that each rectifier is automatically cut off in the process of delivering cut-off current to the main switch $GR_{131}$.

In the analysis and practice of the invention modifications will undoubtedly occur to those skilled in the art. The invention is thus not limited to the specific circuits shown and described, but departures may be made therefrom within the scope of the accompanying claims without departing from the principles of the invention and without sacrificing its chief advantages.

What is claimed is:

1. A switching type regulated D.C. power supply adapted to be energized from a rectified alternating current source of variable frequency, comprising an output circuit for delivering a D.C. output, semiconductive switching means having a switch circuit adapted to conduct unipolar current between said source and said output circuit for regulating said output, error sensing means operatively connected to said output circuit, synchronized wide band switch control means operatively coupled to said switching means and to said error sensing means for switching said switching means, said switch control means including reset means connected to be responsive to the amplitude of said source for conditioning said control means in synchronism with said source, said control means being responsive to said reset means and said error sensing means whereby said switch circuit is rendered conductive during the leading period of said alternating current source to regulate the amplitude of said D.C. output, said switch control means also comprising latching means having a memory characteristic and operable to periodically deactivate said control means and holding same deactivated in synchronism with the cycling of said source.

2. A supply as defined in claim 1 in which said reset means comprise circuit connections for making said switch control means responsive to the amplitude of said alternating current source.

3. A supply as defined in claim 1 in which said semiconductive switching means is energized at low frequency values of said alternating current source with a substantially unfiltered voltage derived from said source.

4. A supply as defined in claim 1 in which said latching means and semi-conductive switching means each comprise controlled rectifiers and said error sensing means include reference potential means connected to said output circuit and the controlled rectifier of said latching means.

5. A supply as defined in claim 1 in which said output circuit includes a variable impedance regulator energized by said switching means.

6. A supply as defined in claim 1 in which said switch control means include a controlled rectifier having an anode-cathode circuit included in said latching means, and a gate-cathode circuit forming a component of said error sensing means.

7. A supply as defined in claim 6 in which said semiconductive switch means comprise a power carrying controlled rectifier and said reset means comprise circuit connections to said controlled rectifier of said switch control means for sampling the amplitude of said alternating current source.

8. A switching regulator for a D.C. power supply comprising a full wave rectifier adapted to be energized from an alternating current source of variable frequency, an output circuit for supplying a regulated output, switch means serially interconnected between said full wave rectifier and said output circuit, switch control means adapted to be synchronously coupled with said alternating current source and coupled to said output circuit and said switch means for synchronously switching said switch means in accordance with said output and with said alternating current source to regulate said output, said switch control means including a latching circuit energized at the termination of the conducting periods of said switch means and having a memory characteristic to hold said switch means disabled.

9. A regulator as defined in claim 6 in which said switch control means comprise a controlled rectifier and said latching circuit includes the anode-cathode circuit of said controlled rectifier.

10. A regulator as defined in claim 9 in which the gate-cathode circuit of said controlled rectifier includes reference potential means and is connected to said output circuit for energizing said controlled rectifier when said output attains a prescribed value.

11. A regulated D.C. power supply adapted to be energized from a rectified alternating current source comprising an output circuit for delivering a D.C. output, a switching element having an output current conducting circuit connected between said source and said output circuit, and a wide band synchronized switch control circuit operatively coupled to said switching element and said output circuit and including error detecting means, reference potential means, reset means and latching means, said error detecting means being responsive to said output and to said reference potential means, said reset means being responsive to said A.C. source, and said latching means having a memory characteristic and being responsive to the output of said control circuit whereby switching of said current conducting circuit to the conductive state occurs during the first 90° interval of a period of said alternating current source, said conductive condition is maintained until said error detector signals a predetermined error condition whereupon said switching element is switched off, said conducting circuit is latched in the off condition for an interval related to the period of said A.C. source, and said control circuit is reset to render it active for a subsequent 90° interval.

12. A supply as defined in claim 11 in which said error detecting means comprise the gate-cathode circuit of a controlled rectifier, said latching means include the anode-cathode circuit of said controlled rectifier and said reset means comprise coupling means for connecting said anode-cathode circuit to said source.

13. A supply as defined in claim 12 in which said switching element comprises a power transistor and including a control transistor interconnecting said controlled rectifier and said power transistor.

14. A supply as defined in claim 12 in which said switching element comprises a controlled power rectifier and said switch control circuit includes cut-off means responsive to said D.C. output for driving reverse current through said controlled power rectifier.

15. A supply as defined in claim 14 in which said cut-off means comprise a pair of alternately operative controlled rectifiers and respective stored voltage sources.

16. A regulated D.C. power supply adapted to be energized from an alternating current source of variable frequency, comprising an output circuit for delivering a D.C. output, transistor switching means having an emitter-collector circuit adapted to conduct unipolar current between said source and said output circuit, an error sensing circuit operatively connected to said output circuit and including reference potential means, switch control means coupled to said transistor switching means and to said error sensing means for switching said switching means, said switch control means including reset connecting means for synchronizing said source and said switch control means, whereby said emitter-collector circuit is conductive during the leading period of said alternating current source to increase the amplitude of said D.C. output to a reference value, said switch control means also comprising latching means operable to periodically deactivate said control means until subsequent conditioning by said reset means.

17. A regulated D.C. power supply adapted to be energized from a rectified alternating current source of variable frequency, comprising an output circuit for delivering a D.C. output, load carrying controlled rectifier means having an anode-cathode circuit adapted to conduct unipolar current between said source and said output circuit, an error sensing circuit operatively connected to said output circuit, synchronized wide band switch control means operatively coupled to said controlled rectifier means and to said error sensing circuit for controlling the switching of said controlled rectifier, said switch control means including reset means responsive to the amplitude of said source for conditioning said control means, said control means being responsive to said reset means and said error sensing circuit whereby said anode-cathode circuit is conductive during the leading period of said alternating current source to regulate the amplitude of said D.C. output, said switch control means also comprising cut off means operable to periodically supply reverse cut off current to said controlled rectifier.

References Cited

UNITED STATES PATENTS

| | | | |
|---|---|---|---|
| 2,776,382 | 1/1957 | Jensen | 307—88.5 |
| 3,009,093 | 11/1961 | Seike | 323—22 |
| 3,076,135 | 1/1963 | Farnsworth | 307—88.5 |
| 3,123,759 | 3/1964 | Grey | 321—18 |
| 3,211,989 | 10/1965 | Mintz et al. | 323—22 |
| 3,213,350 | 10/1965 | Armour | 323—22 |
| 3,260,920 | 7/1966 | Shoemaker | 321—18 |

OTHER REFERENCES

Power Supply Uses Switching Preregulation, Electronics, March 9, 1962 McGraw Hill, N.Y. TK–7800E58 (pages 62–64 relied on).

JOHN F. COUCH, *Primary Examiner.*

M. L. WACHTELL, *Assistant Examiner.*